US009807306B2

United States Patent
Yu et al.

(10) Patent No.: US 9,807,306 B2
(45) Date of Patent: Oct. 31, 2017

(54) APPARATUS AND METHOD FOR PHOTOGRAPHING IMAGE IN CAMERA DEVICE AND PORTABLE TERMINAL HAVING CAMERA

(71) Applicant: Samsung Electronics Co., Ltd., Suwon-si, Gyeonggi-do (KR)

(72) Inventors: Seockhyun Yu, Seoul (KR); Kyunghwa Kim, Seoul (KR); Seonhwa Kim, Seoul (KR); HeeJin Kim, Seoul (KR); Mijung Park, Hwaseong-si (KR); Joah Choi, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/136,524

(22) Filed: Dec. 20, 2013

(65) Prior Publication Data

US 2014/0184858 A1 Jul. 3, 2014

(30) Foreign Application Priority Data

Jan. 3, 2013 (KR) .................... 10-2013-0000665

(51) Int. Cl.
*H04N 5/222* (2006.01)
*H04N 5/232* (2006.01)
*H04N 7/18* (2006.01)
*H04N 5/14* (2006.01)
*H04N 5/235* (2006.01)
*H04N 5/262* (2006.01)

(52) U.S. Cl.
CPC ......... *H04N 5/23293* (2013.01); *H04N 5/144* (2013.01); *H04N 5/2356* (2013.01); *H04N 5/23254* (2013.01); *H04N 5/2621* (2013.01)

(58) Field of Classification Search
USPC ........ 348/155, 239, 333.01, 333.02, 333.11, 348/333.12, 333.04
See application file for complete search history.

(56) References Cited

U.S. PATENT DOCUMENTS

| | | | | |
|---|---|---|---|---|
| 8,259,208 | B2 * | 9/2012 | Ciurea et al. | 348/333.02 |
| 8,340,351 | B2 * | 12/2012 | Adcock | G11B 27/034 348/241 |
| 8,472,722 | B2 * | 6/2013 | Nayar et al. | 382/190 |
| 8,482,651 | B2 * | 7/2013 | Asukai | G06T 5/50 348/208.13 |
| 8,509,499 | B2 * | 8/2013 | Ioffe et al. | 382/118 |
| 8,570,403 | B2 * | 10/2013 | Lee et al. | 348/239 |
| 8,615,111 | B2 * | 12/2013 | Garten | G06T 5/005 382/107 |

(Continued)

OTHER PUBLICATIONS http://techcrunch.com/2012/01/16/groupshot-launches-impressive-face-swapping-photo-editing-app-for-iphone/; posted by Sarah Perez on Jan. 16, 2012.*

*Primary Examiner* — Ngoc-Yen Vu
(74) *Attorney, Agent, or Firm* — Jefferson IP Law, LLP

(57) ABSTRACT

A method for photographing an image and a portable terminal having a camera for photographing an image are provided. The method includes buffering a burst shot image and displaying a frame image, erasing an object having a movement in the displayed image, and generating and displaying a still image by replacing the displayed image including the object having the movement, at location where the object is erased, with a buffered image.

9 Claims, 18 Drawing Sheets

(56) References Cited

U.S. PATENT DOCUMENTS

| | | | |
|---|---|---|---|
| 8,768,070 B2* | 7/2014 | Gelfand | G06T 11/60 348/E7.071 |
| 8,773,566 B2* | 7/2014 | Wang | H04N 5/232 348/239 |
| 9,014,500 B2* | 4/2015 | Shuster | G06K 9/62 382/254 |
| 9,025,044 B2* | 5/2015 | Fukuya et al. | 348/222.1 |
| 9,560,271 B2* | 1/2017 | Na | H04N 5/23222 |
| 9,641,818 B1* | 5/2017 | Sharma | H04N 9/74 |
| 9,659,350 B2* | 5/2017 | Kobayashi | G06T 3/4038 |
| 2005/0129324 A1* | 6/2005 | Lemke | H04N 1/387 382/254 |
| 2010/0045813 A1* | 2/2010 | Chen | 348/222.1 |
| 2010/0086175 A1* | 4/2010 | Yokono | G06K 9/4619 382/103 |
| 2011/0261219 A1* | 10/2011 | Suzuki | H04N 5/23219 348/222.1 |
| 2012/0327172 A1* | 12/2012 | El-Saban et al. | 348/14.02 |
| 2014/0079341 A1* | 3/2014 | Ishigami | H04N 1/3872 382/309 |
| 2015/0029349 A1* | 1/2015 | Ben Israel | H04N 5/23277 348/208.4 |

* cited by examiner

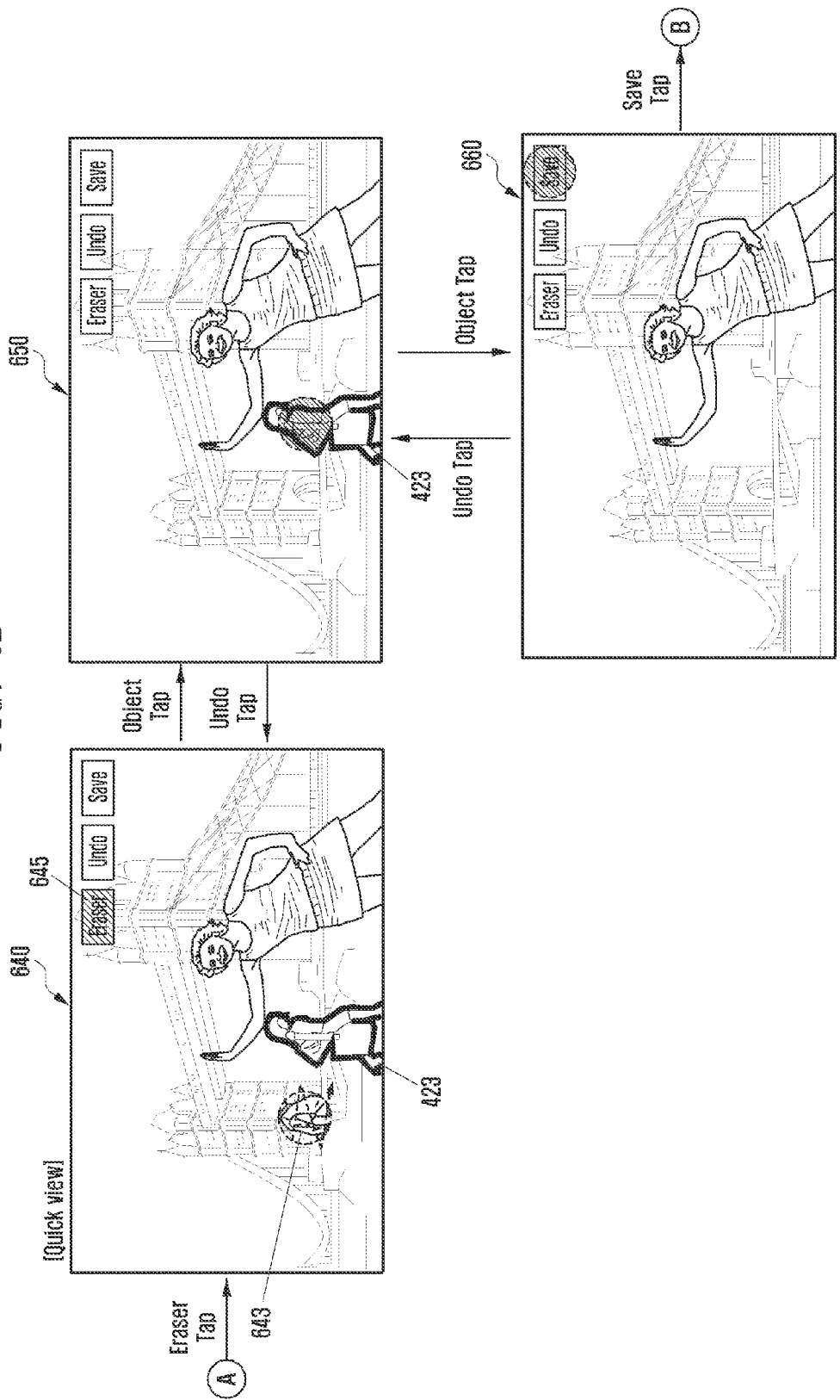

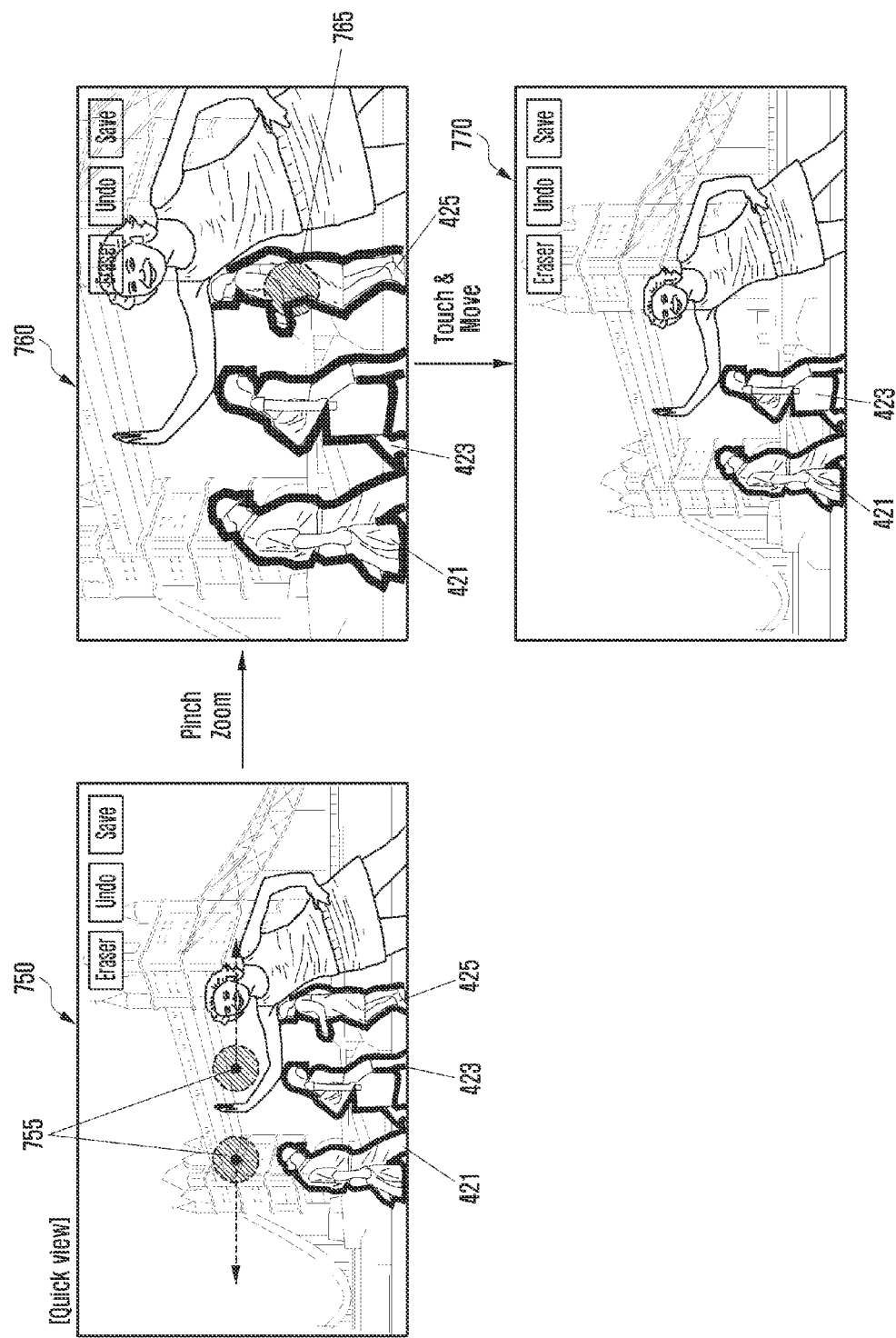

APPARATUS AND METHOD FOR PHOTOGRAPHING IMAGE IN CAMERA DEVICE AND PORTABLE TERMINAL HAVING CAMERA

CROSS-REFERENCE TO RELATED APPLICATION(S)

This application claims the benefit under 35 U.S.C. §119(a) of a Korean patent application filed on Jan. 3, 2013 in the Korean Intellectual Property Office and assigned Serial No. 10-2013-0000665, the entire disclosure of which is hereby incorporated by reference.

TECHNICAL FIELD

The present disclosure relates to an apparatus and a method for photographing an image with a portable terminal having a camera. More particularly, the present disclosure relates to an apparatus and a method for generating a still image by processing burst shot images.

BACKGROUND

Generally, when photographing a portrait or landscape by using a camera device or a portable terminal having a camera, an undesirable subject or object may be included in the photographed image. In this case, the undesirable subject or object included in the photographed image has to be erased or edited manually. In order to modify a specific object of the photographed image, a user may use a manual method of modifying a specific area of the image by copying and pasting another image or by replacing a portrait selected by the user with another face of burst shot images.

However, the image editing method of the related art described above is inconvenient since it complicates the process of editing a photographed image.

Therefore, a need exists for an apparatus and a method for automatically displaying an image area in which an error is generated when photographing an image with a camera device or a portable terminal having a camera.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for automatically displaying an image area in which an error is generated when photographing an image with a camera device or a portable terminal having a camera.

Another aspect of the present disclosure provides an apparatus and a method for displaying an image area in which an error is generated when photographing an image with a camera device or a portable terminal having a camera, and for enabling automatic editing of an erroneous image photographed by the camera device or the portable terminal having a camera according to a user's selection.

Another aspect of the present disclosure is to provide a portable terminal having a camera that continuously photographs a subject in a burst shot mode, extracts and displays each object having a movement among the burst shot images, and generates an edited image by automatically erasing an object, if the corresponding object is selected by a user.

Another aspect of the present disclosure is to provide a camera device and a portable terminal having a camera for displaying images of a corresponding location, if a specific area is selected from photographed images, and for generating an edited image by replacing an image selected by a user with an image of an area selected by the user.

In accordance with an aspect of the present disclosure, a method for photographing an image with a portable terminal having a camera is provided. The method includes buffering a burst shot image and displaying an image, erasing an object having a movement in the displayed image, and generating and displaying a still image by replacing the displayed image including the object having the movement, at a location where the object is erased, with a buffered image.

In accordance with an aspect of the present disclosure, a method for photographing an image with a portable terminal having a camera is provided. The method includes buffering a burst shot image and displaying an image, displaying an error editing menu, processing an eraser mode by erasing an object having a movement from the displayed images, if the eraser mode is selected in the error editing menu, and generating and displaying a still image by replacing the displayed image including the object having the movement, at a location where the object is erased, with a buffered image, replacement editing by displaying an image corresponding to an erroneous area of the buffered images, if the error editing mode is selected in the error editing menu, and replacing the image of the erroneous area with a selected image, if the displayed image is selected.

In accordance with an aspect of the present disclosure, an apparatus for photographing an image is provided. The apparatus includes a camera configured to obtain an image by a burst shot, a storage unit configured to buffer burst shot images, an input unit configured to generate a device control command, a control unit configured to control the camera to perform the burst shot, if photographing is requested through the input unit, to buffer the burst shot image in the storage unit and to display an image, and to generate a still image by extracting and erasing an object having a movement from the displayed image by replacing the object having a movement with a buffered image, and a display unit configured to display an image under the control of the control unit.

When photographing an image with a camera device or a portable terminal having a camera, this disclosure enables automatic editing of an image by displaying an error of a photographed image, and replacing an undesirable image from the photographed images with another image. Accordingly, this disclosure provides automatic removal of an undesirable subject from the photographed image, and replacing an image area having closed eyes or movement with a normal image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings in which:

FIGS. 6A, 6B and 6C illustrate a procedure of identifying and erasing objects having a movement in a photographed image according to an embodiment of the present disclosure;

FIGS. 7A and 7B illustrate a procedure of erasing a moved object included in an image by expanding the object according to an embodiment of the present disclosure;

Throughout the drawings, it should be noted that like reference numbers are used to depict the same or similar elements, features, and structures.

DETAILED DESCRIPTION

Figure 1:
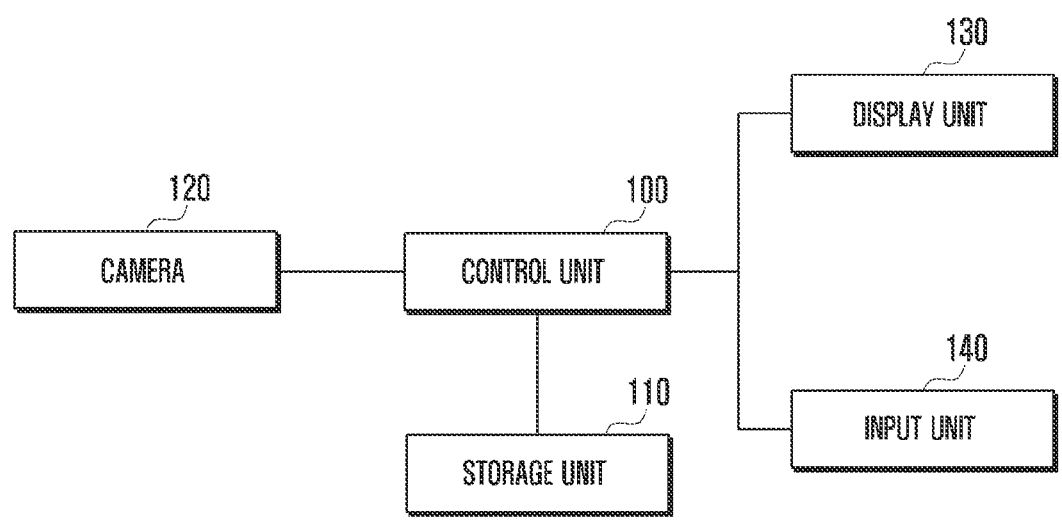
FIG. 1 is a block diagram illustrating a configuration of a camera device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present disclosure relates to an apparatus and a method for editing an error generated while photographing an image in a camera device and/or a portable terminal having a camera. In an embodiment of the present disclosure, a portable terminal having a camera performs burst shot photographing for a period of time, displays burst shot images as a still image, and removes an error by using the burst shot and buffered images, if the error is generated.

More particularly, a camera device or a portable terminal having a camera first performs a burst shot operation in an error removal photographing mode, identifies a movement change of burst shot images, and displays each object having a movement with the images. If a user selects an object having a movement, the camera device detects a corresponding object having an error, and removes and replaces the detected object with a normal image of buffered images.

Hereinafter, an apparatus and a method for photographing an image are described based on a camera device, which may also be applied to a portable terminal having a camera in the same method. Further, the method for photographing an image may be a method for generating a still image by removing an error after performing a burst shot, and the burst shot may have different characteristics from a general burst shot. Namely, in an embodiment of the present disclosure, it takes several seconds (for example, within 5 seconds) to obtain images from the first image to the last image, and the number of frame images obtained in the burst shot may be a plurality of frame images (for example, within 5 frames per second). Accordingly, the burst shot has a longer photographing time compared to a general burst shot, and may have a lower number of frame images per second.

FIG. 1 is a block diagram illustrating a configuration of a camera device according to an embodiment of the present disclosure.

Referring to FIG. 1, a control unit 100 controls the general operation of the camera device. In a photographing mode, the control unit 100 performs a burst shot operation and controls to generate a still image by analyzing the burst shot images and editing an object having an error.

A camera 120 generates a number of images for a period of time by performing a burst shot operation of photographing images under the control of the control unit 100.

A storage unit 110 may include a program memory for storing an operating program of the camera device, and a data memory for storing photographed images. Further, the storage unit 110 buffers photographed burst shot images and stores a still image edited by the control unit 100.

A display unit 130 displays a photographed image under the control of the control unit 100. The display unit 130 may be configured with a Liquid Crystal Display (LCD) or an Organic Light Emitting Diode (OLED). An input unit 140 generates input signals for controlling the photographing operation of the camera device. Here, the display unit 130 and the input unit 140 may be integrated into a touch screen.

In a camera device having the above configuration, a user may set a photographing mode through the input unit 140. Here, the photographing mode may be an error removal photographing mode, which may be set in a setting mode. Here, the error may be generated if an undesirable object is included in the photographed image or if the object is photographed in an undesirable state.

Generally, a photographer takes an image after deciding a composition of a subject by looking through a view finder or the display unit 130. Here, the camera device may have a shutter lag, and accordingly, there may be differences between an image identified by a user through the view finder or the display unit 130 and an image actually photographed. The actually photographed image may include undesired subjects passing by the subject, or an undesirable image may be photographed because a subject moves or closes their eyes at the moment of photographing. An embodiment of the present disclosure provides an apparatus and a method for photographing an image, which enables editing the image if an undesired subject passing by the subject is included in the photographed image or if the subject closes their eyes or generates a blur.

Accordingly, if an error removal photographing mode is selected, a camera device according to an embodiment of the present disclosure first obtains a certain number of images for a period of time by controlling the camera 120 to operate in a burst shot mode, and displays an image set as a default among the obtained images in the display unit 130. Subsequently, the control unit 100 detects an object having a movement by analyzing the images, and removes the detected object having a movement and replaces the removed object with an image having the same background among the burst shot images being buffered.

Further, if an error removal photographing mode is selected, a camera device according to another embodiment of the present disclosure first obtains a certain number of images for a period of time by controlling the camera 120 to operate in a burst shot mode, and displays an image set as default among the obtained images in the display unit 130. Subsequently, if a user selects a specific area of the displayed image, the control unit 100 displays images corresponding to the selected area among the burst shot images being buffered, and replaces the displayed images with the selected image. For example, if the user selects a face area with closed eyes from the displayed image, the control unit 100 displays images having a similar face area among the buffered images. Subsequently, if the user selects an image having a desirable face from the displayed images, the control unit 100 replaces the face image having closed eyes with the face image selected by the user.

Hereinafter, an eraser mode will be used as a term of a photographing mode for extracting and removing an object having a movement in a photographed image, and the error removal photographing mode will be used as a term of the photographing mode for editing a photographed image by using an object selected by a user.

As described above, the error editing photographing method in a camera device may be a method of removing an object having a movement or a method of replacing an object at a location of error generation with an object of a normally photographed image.

The error removal method of removing an object having a movement from an image photographed by a camera device according to the embodiment of the disclosure is described below.

Figure 2:
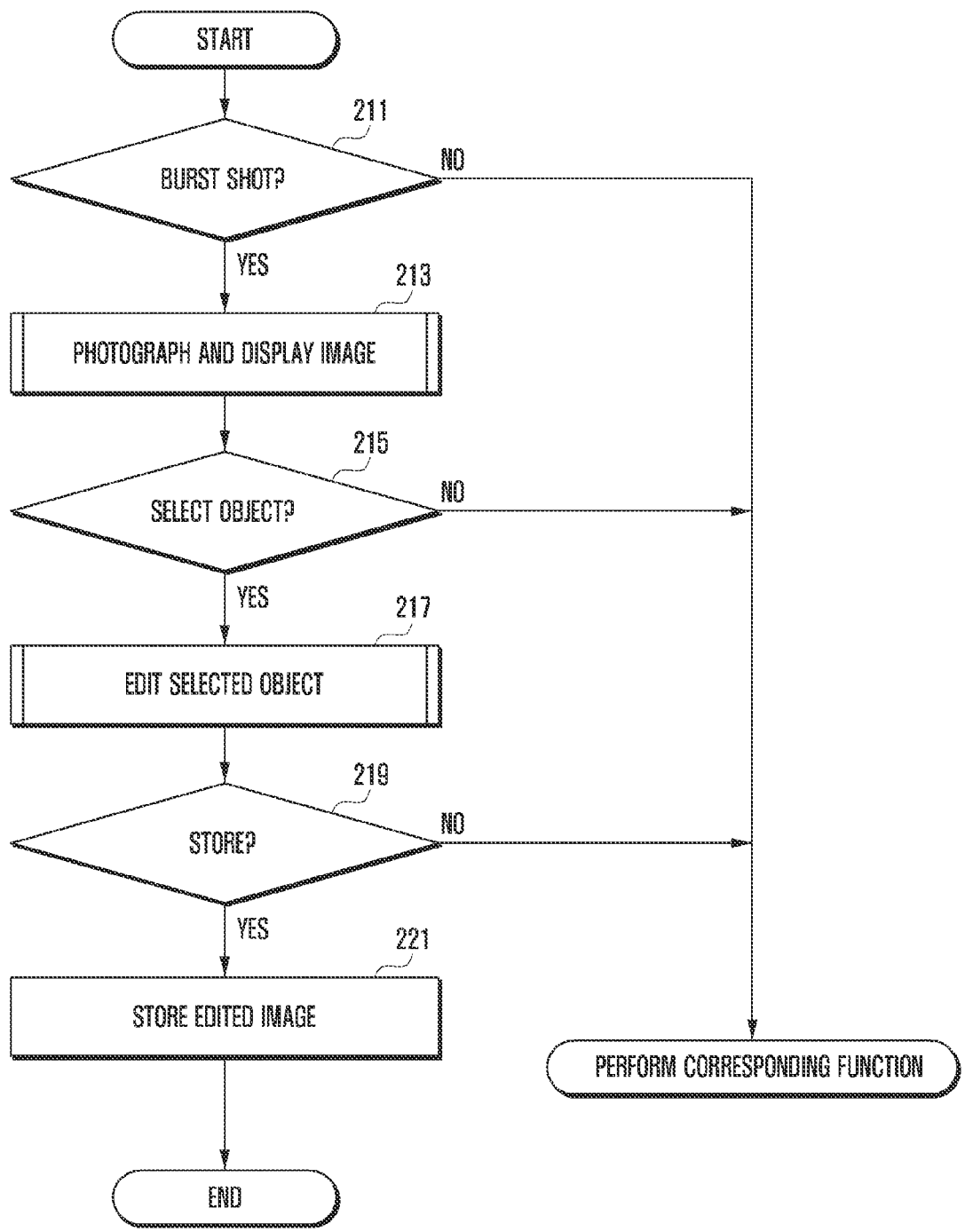
FIG. 2 is a flowchart illustrating a procedure of erasing an object having a movement component in a camera device according to an embodiment of the present disclosure.

FIG. 2 is a flowchart illustrating a procedure of erasing an object having a movement component in a camera device according to an embodiment of the present disclosure.

Referring to FIG. 2, if a photographer selects a photographing mode for removing an error through the input unit 140, the control unit 100 detects it and controls the camera 120 to operate in a burst shot mode, and buffers burst shot images obtained by the camera 120 at operation 211. If the burst shot is performed as described above, the control unit 100 controls the display unit 130 to display a frame image among the photographed images as a still image at operation 213. Subsequently, the control unit 100 analyzes movements of each object in the burst shot images, and controls to display each object having a movement in the displayed image according to the analysis result.

If the user selects an object in the state of displaying the object having a movement, the control unit 100 detects it at operation 215, and removes the selected object and replaces the area of the removed object with a background image at operation 217. Namely, the control unit 100 removes the selected object (i.e., the object having a movement), and replaces the area of the removed object with an image of a corresponding area from another frame image. After removing the object having a movement, if storing an image is requested, the control unit 100 detects it at operation 219, and stores an edited image as a still image at operation 221. Here, the buffered images may be deleted.

Figure 3:
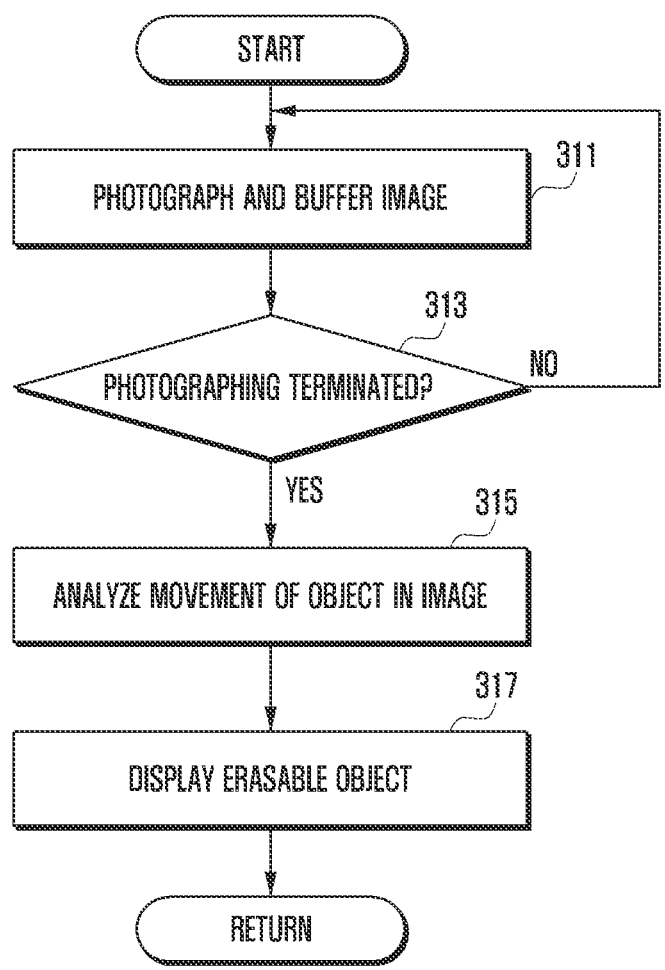
FIG. 3 is a flowchart illustrating a procedure of displaying an object having an error in a photographed image according to an embodiment of the present disclosure.
Figure 4:
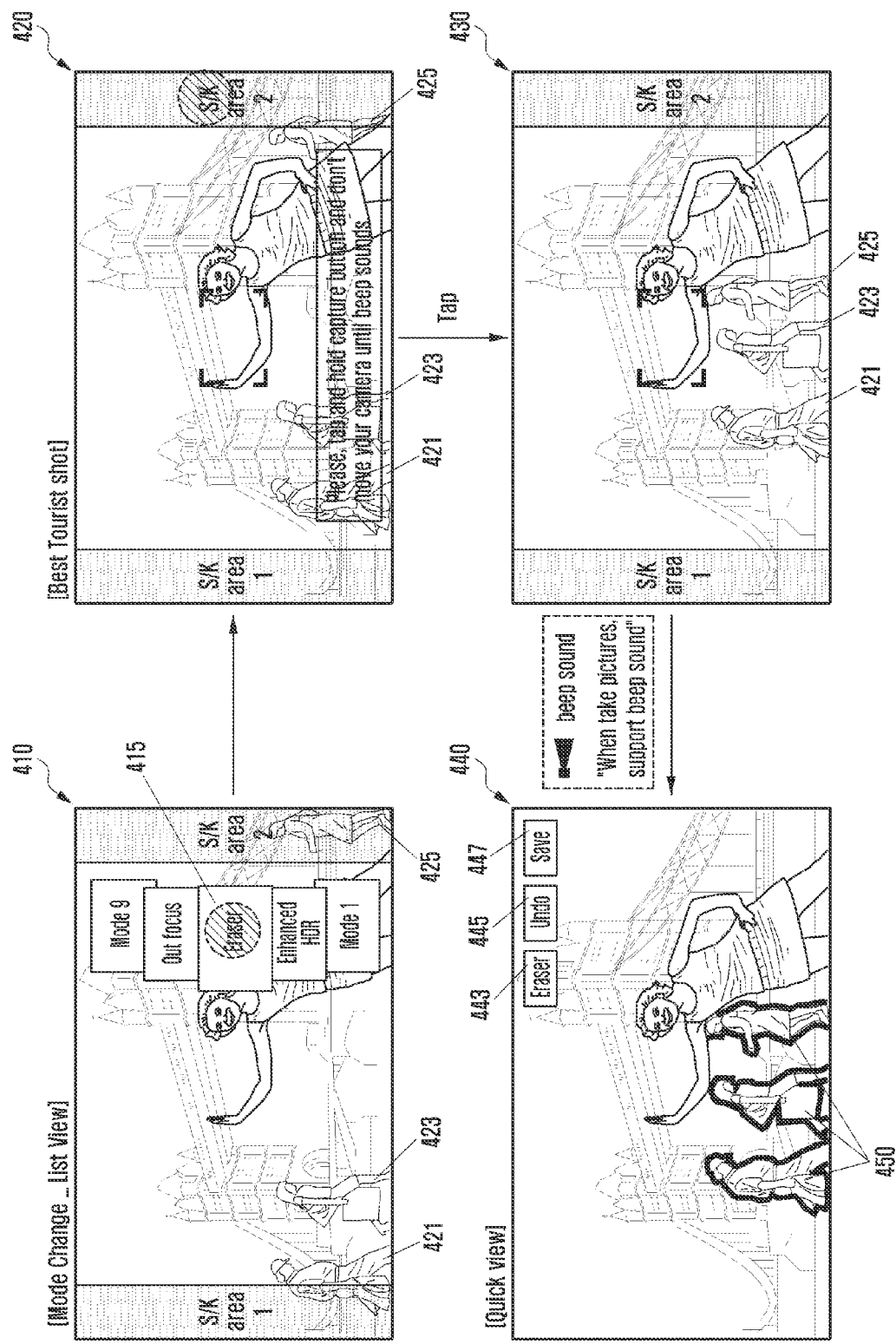
FIG. 4 illustrates a procedure of identifying objects having a movement in a photographed image according to an embodiment of the present disclosure.

FIG. 3 is a flowchart illustrating a procedure of displaying an object having an error in a photographed image according to an embodiment of the present disclosure, and FIG. 4 illustrates a procedure of identifying objects having a movement in a photographed image according to an embodiment of the present disclosure.

Referring to FIGS. 3 and 4, if a photographing mode is selected in a setting mode, the control unit 100 controls to display a photographing menu including an error removal menu 415, as shown in Screen 410 of FIG. 4. The control unit 100 controls to display buttons 443 to 447 on the image. Here, an eraser button 443 is a button to erase an object having a movement, an undo button 445 is a button to return to the previous screen, and a save button 447 is a button to store an edited image.

If a user selects the error removal menu 415, the control unit 100 controls the camera 120 to operate in a burst shot mode, and buffers burst shot images obtained by the camera 120, as shown in Screens 410 to 430 at operation 311. Here, the burst shot method for removing an error may have different characteristics compared to a general burst shot method. The burst shot method for removing an error may have a longer photographing time than a general burst shot method (for example, about 5 seconds), and may have a lower frame rate (for example, about 5 frames per second). Namely, the burst shot method may be a burst shot method having a longer photographing time compared to the general burst shot method, and may obtain a fewer number of frame images per second.

If the burst shot is performed as described above, the control unit 100 controls the display unit 130 to display a frame image among the photographed images as a still image, as shown in Screen 440 of FIG. 4 at operation 313. Here, the still image 440 displayed in the display unit 130 may be a frame image set as default, and the default image may be the first frame image, the last frame image, or a specific frame image among the burst shot images (for example, a frame image having an intermediate value). Moreover, the still image displayed in the display unit 130 may be an image including a plurality of frame images selected from the buffered images.

Further, the control unit 100 analyzes movements of each object in the burst shot images at operation 315. When taking a photo, a moving subject or object may be included in the photo. Such objects may be undesirable in the photographed image and it is preferable to remove each object having a movement in the burst shot images at operation 317. Detecting the movement of each object in the images may be decided by determining location changes of each object in the buffered images. In detecting the movements of each object, the control unit 100 may not check all the frame images of the burst shot images but selectively checks frame images with a frame interval. For example, if the photographing is performed at a frame rate of 5 for 5 seconds, the total number of obtained frame images becomes 25 (5 frames*5 sec=25 frames). In this case, the control unit 100 may determine the movement of an object every 5 frames. The control unit 100 may identify an object having a movement if the location of the object in the image changed more than a certain distance. Screens 410 to 430 of FIG. 4 show each moving object photographed in the burst shot.

If each moving object 421 to 423 is identified from the image, the control unit 100 controls the display unit 130 to display each moving object in the image by emphasizing as shown in Screen 450 of FIG. 4. Here, the method of emphasizing an object having a movement may be performed by outlining the object with a thick line as shown in Screen 450 of FIG. 4 or by displaying the object in a translucent form or in a different color.

Figure 5:
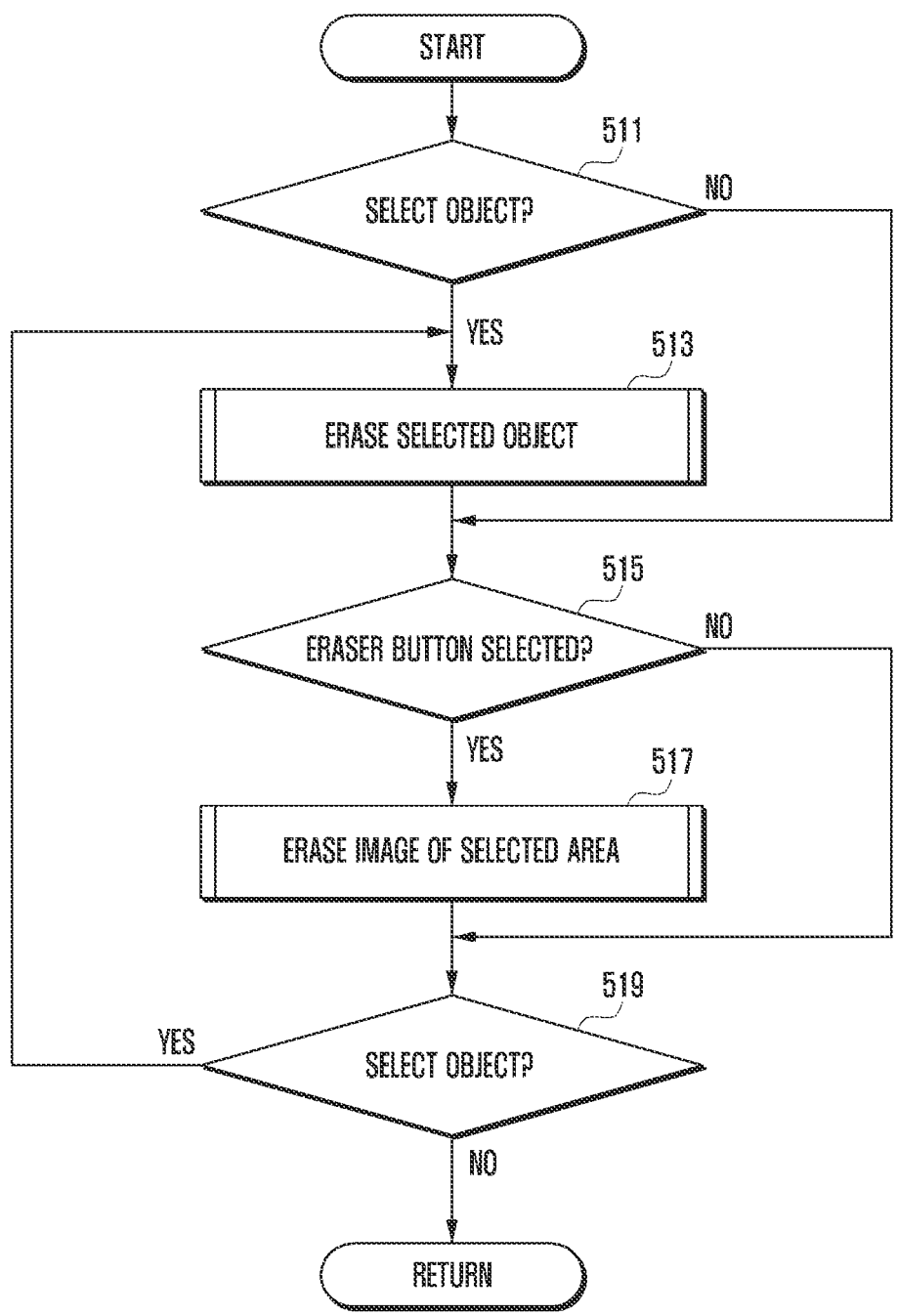
FIG. 5 is a flowchart illustrating a procedure of erasing an object having a movement according to an embodiment of the present disclosure.
Figure 6A:
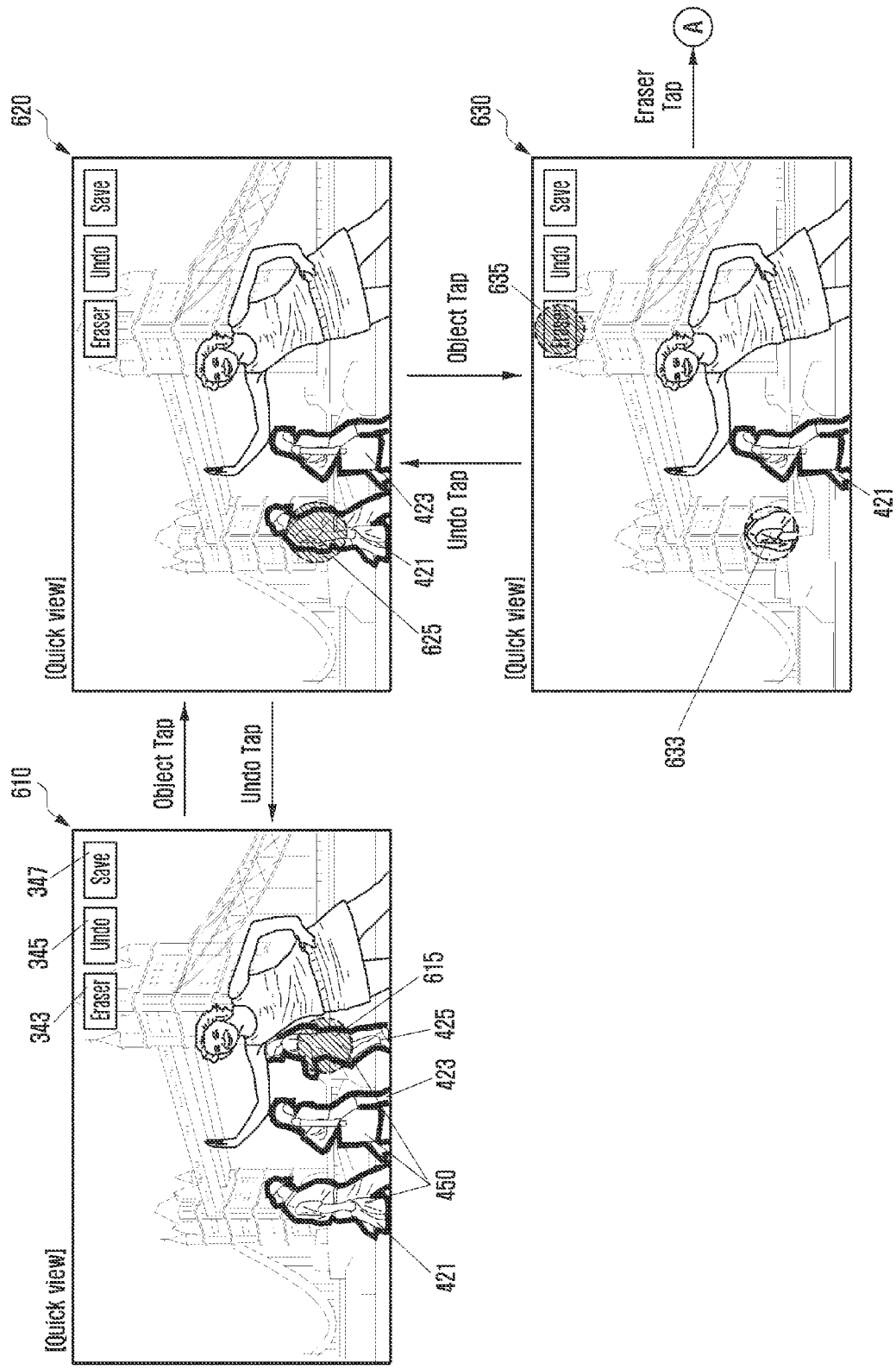
Figure 6C:
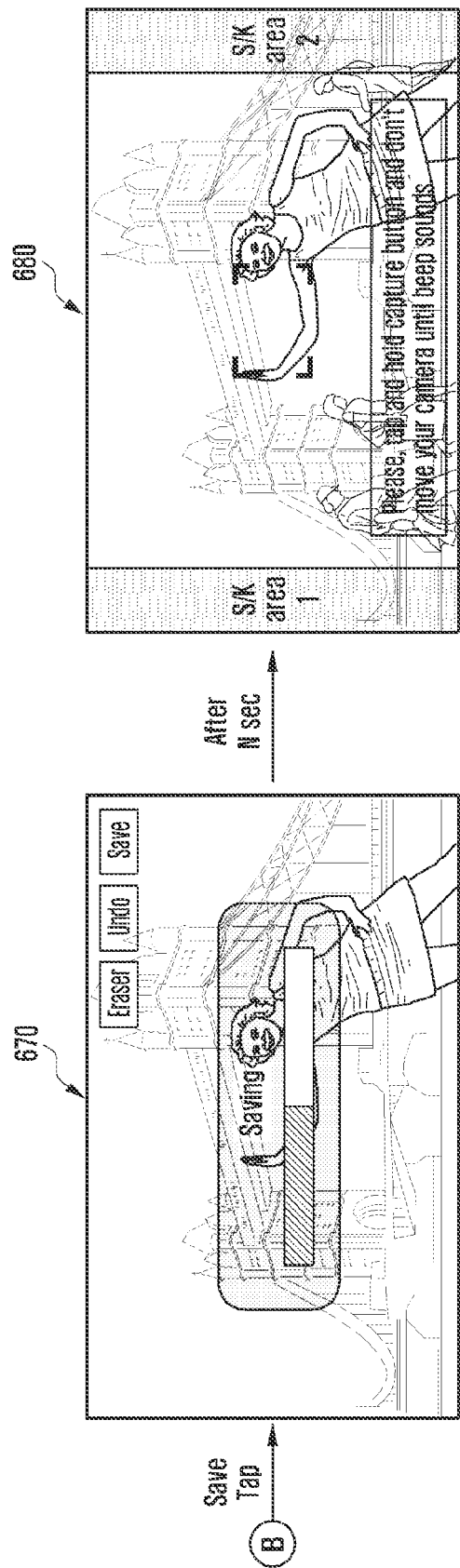

FIG. 5 is a flowchart illustrating a procedure of erasing an object having a movement according to an embodiment of the present disclosure, and FIGS. 6A, 6B, and 6C illustrate a procedure of identifying and erasing objects having a movement in a photographed image according to an embodiment of the present disclosure.

Referring to FIGS. 5 and 6A, 6B, and 6C, each object having a movement is emphasized in the displayed image to distinguish from other objects as shown in Screen 610. The control unit 100 controls to display buttons 343 to 347 on the image. Here, an eraser button 343 is a button to erase an object having a movement, an undo button 345 is a button to return to the previous screen, and a save button 347 is a button to store an edited image.

In a state of image shown as Screen 610, if a user selects an object (for example, object 425) by touching an area 615, the control unit 100 detects it at operation 511, and removes the selected object (object 425) as shown in Screen 620 and replaces the selected object with another image at operation 513. In an embodiment of the present disclosure, selecting an object to be removed is assumed to be performed as one by one selection. After removing one object as shown in Screen 620, if the user selects another object (for example, object 421 of Screen 620) by touching an area 625, the control unit 100 detects it at operation 519, and removes the selected object (object 421 of Screen 630) by returning to operation 513.

If the selected object is not completely removed as shown by 633 of Screen 630, the user selects the eraser button 343 of Screen 630 by touching an area 635 and erases the remaining object, upon selecting an eraser button 645 of Screen 630, by rubbing as shown by 643 of Screen 640. If the control unit 100 detects a selection of eraser button 343 of Screen 630 at operation 515, the control unit 100 identifies a location selected by the user through the input unit 140 and removes an image of a corresponding location (location of object 643) and replaces the removed image with another image at operation 517. Subsequently, if another object is selected as shown in Screen 650, the control unit 100 detects it at operation 519, and removes the selected object and replaces the selected object with an image of another frame by returning to operation 513.

Accordingly, if each object 421 to 425 having a movement is selected, the control unit 100 removes each of the selected objects and areas of removed object are replaced with corresponding images of other frames. If an undesirable image is included in the photo, the control unit 100 may generate an image as shown in Screen 660 by editing the image according to the user's intention. If the user selects the save button 347 in the image editing state of Screen 660, the control unit 100 detects it and stores the image of Screen 660 as a still image and displays a storing state in the display unit 130 as shown in Screen 670. Subsequently, if the image editing is finished, the control unit 100 switches to a preview mode and displays a preview screen photographed by the camera 120 as shown in Screen 680.

In an embodiment of the present disclosure, the method for removing an object having a movement is performed by selecting the image one by one as shown in FIGS. 6A, 6B, and 6C. However, when removing the object having a movement, a method of selecting a plurality of objects and removing them at once may be used. Further, a method of automatically removing each object having a movement without selecting them may also be used. Namely, the control unit 100 may detect each object having a movement and automatically remove them, and incompletely removed objects may be erased by using the eraser button as shown in Screens 630 and 640.

The object having a movement may have a small size. In this case, it may be difficult to select the object having a movement (i.e., difficult to designate a location of the object). Accordingly, it may be preferable to enlarge and remove the object having a movement.

Figure 7A:
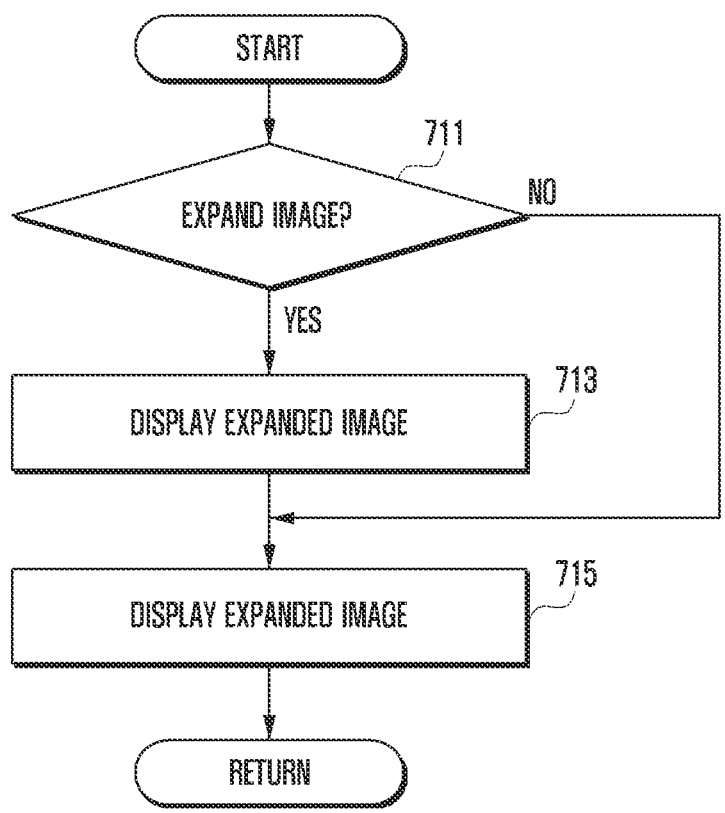
Figure 8A:
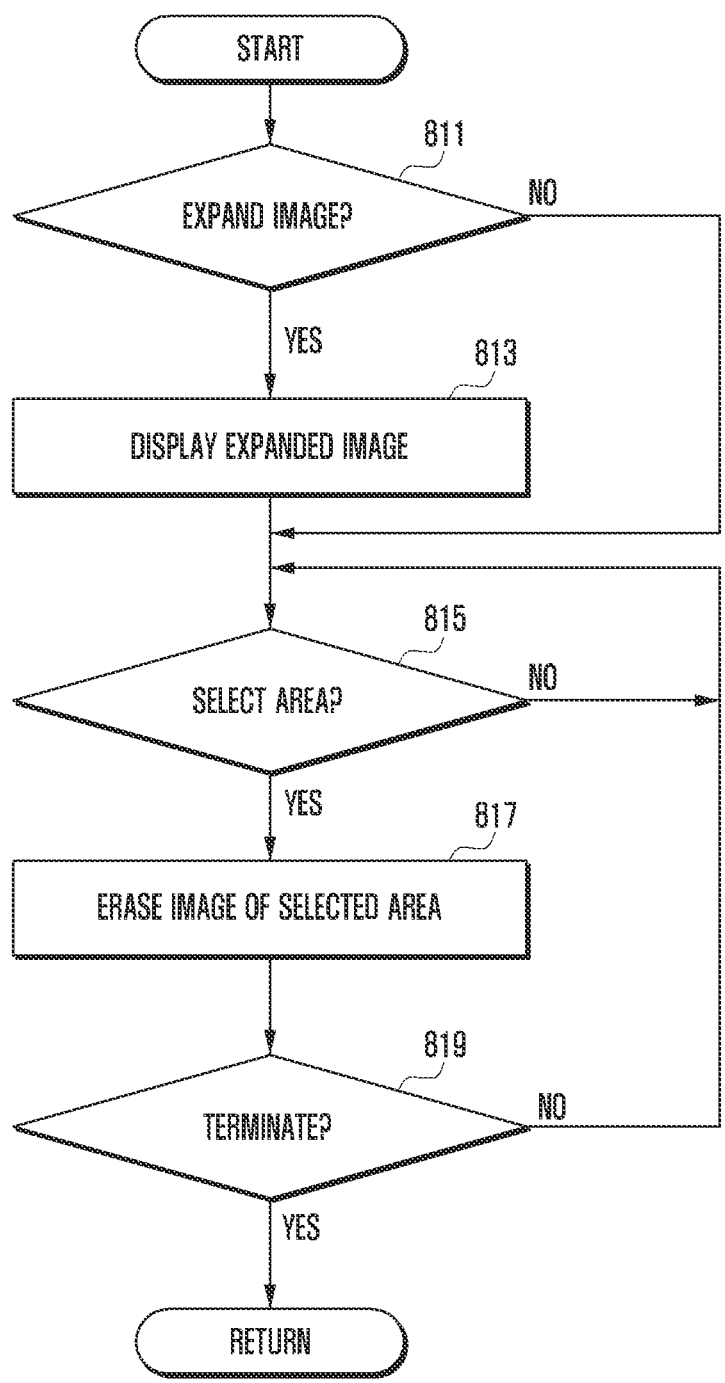
FIGS. 8A and 8B illustrate a procedure of removing an incompletely removed object by expanding the object according to an embodiment of the present disclosure.
Figure 8B:
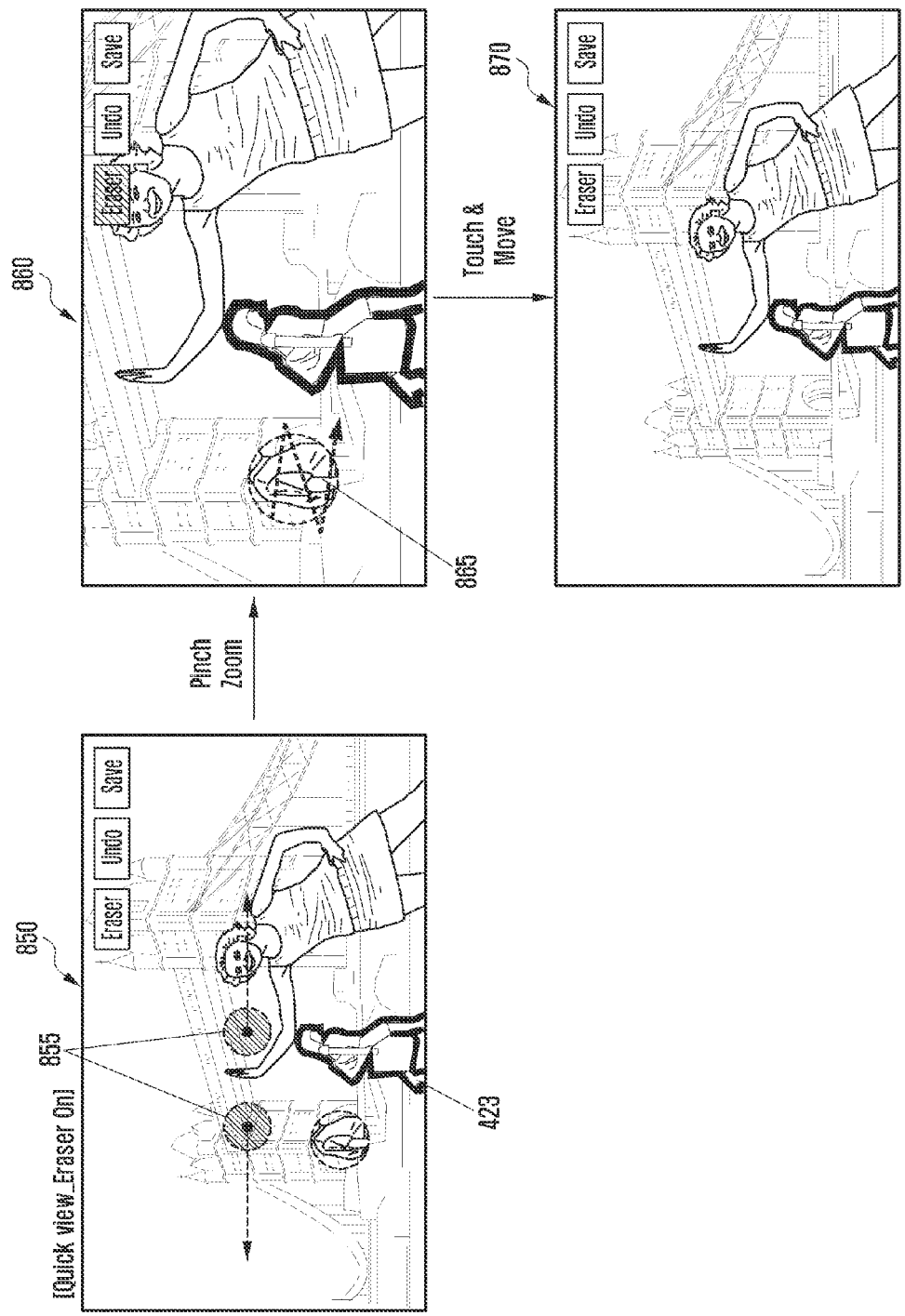

FIGS. 7A and 7B illustrate a procedure of erasing a moved object included in an image by expanding the object according to an embodiment of the present disclosure, and FIGS. 8A and 8B illustrate a procedure of removing an incompletely removed object by expanding the object according to an embodiment of the present disclosure.

Referring to FIGS. 7A and 7B, if a pinch zoom touch interaction is performed as shown by 755 in Screen 750 displaying objects having a movement, the control unit 100 detects it at operation 711, and controls to display an image at the location of pinch zoom generation by expanding the image as shown in Screen 760 at operation 713. Here, the location of the expanded image in Screen 760 may be an area in which the objects having a movement are located. If the user selects an object to be removed from the expanded images by touching an area 765, the control unit 100 detects it and removes the selected object at operation 715, and displays the image of original size after deleting the selected image as shown in Screen 770.

Referring to FIGS. 8A and 8B, if an object to be removed is incompletely removed, a residual object may exist as shown in Screen 850. In this case, the user may perform a pinch zoom operation as shown by 855, and the control unit 100 detects it at operation 811 and displays the residual object by expanding as shown in Screen 860 at operation 813. If the user clicks the eraser button as shown in Screen 850 and rubs the corresponding area of object as shown by 865, the control unit 100 detects a selection of an erasing area at operation 815, removes the object of the selected area at operation 817, detects the termination of erasing at operation 819, and displays the image of original size as shown in Screen 870.

In an embodiment of the present disclosure, the camera device performs a burst shot operation in photographing, and can edit an image of error generated location by using the burst shot images. Here, the method of editing an image may be removing an object having a movement and replacing the image of the error generated location with another image of buffered images. The method of replacing an image provides selecting areas, such as a face area, an area of error generation (for example, blur), an area having an obstacle, and an area requiring an exposure compensation, and displaying other images for the selected areas, so that the user can select an image to be edited.

The control unit 100 may have the following configuration and functions. First, in order to remove an image having a moving component, the control unit 100 may have a function for detecting a movement of object. Further, the control unit 100 may have a function providing a user to select an image area from buffered images so that the user can replace the selected image area with another one. In this case, the control unit 100 may include a subject selector and a replacement image detector. Here, the subject selector may include a portrait selector and object selector, and the replacement image detector may also include a portrait replacement detector and a replacement object detector.

Hereafter, a method of replacing a subject in an image is described. The portrait selector identifies a subject in a photo by face recognition, and displays substitutive portraits according to the characteristics of identified subject (for example, eyes, mouth, and other face area), and selects a portrait to be edited. The portrait replacement detector searches photos having a face similar to the characteristics of the identified subject (for example, eyes, mouth, and other face area) from buffered images photographed by a burst shot operation. The priority of searching substitutive portraits may be set in various ways and the following sequences may be used. First, images having no blocking factor (i.e., an obstacle covering a face) are searched. Second, images having no blur are searched. Third, images having no closed eyes (showing pupils) are searched. Fourth, images having eyes directed to the front are searched. Fifth, images having a smiling face are searched. Sixth, images having the closest location, size, and angle compared to an object to be replaced are searched. The searched images according to the above priorities are used to replace an image of a certain location.

Subsequently, a method of replacing an object image is described. The object selector selects an object by setting a location requiring an image replacement, and may be performed by inputting a touch interaction (for example, by rubbing a desired area). The replacement object detector searches photos including a similar object by identifying the characteristics of the selected object (for example, similar color and pattern), and the priority of searching an object may be performed in the following sequences. First, the replacement object detector searches images having no blocking factor (i.e., an obstacle covering an object) from buffered images. Second, images having no blur are searched. Third, images having a correct exposure are searched (images having an over-exposure and under-exposure are excluded from the searching). Fourth, images having the closest location, size, and angle compared to an object to be replaced are searched.

Figure 9:
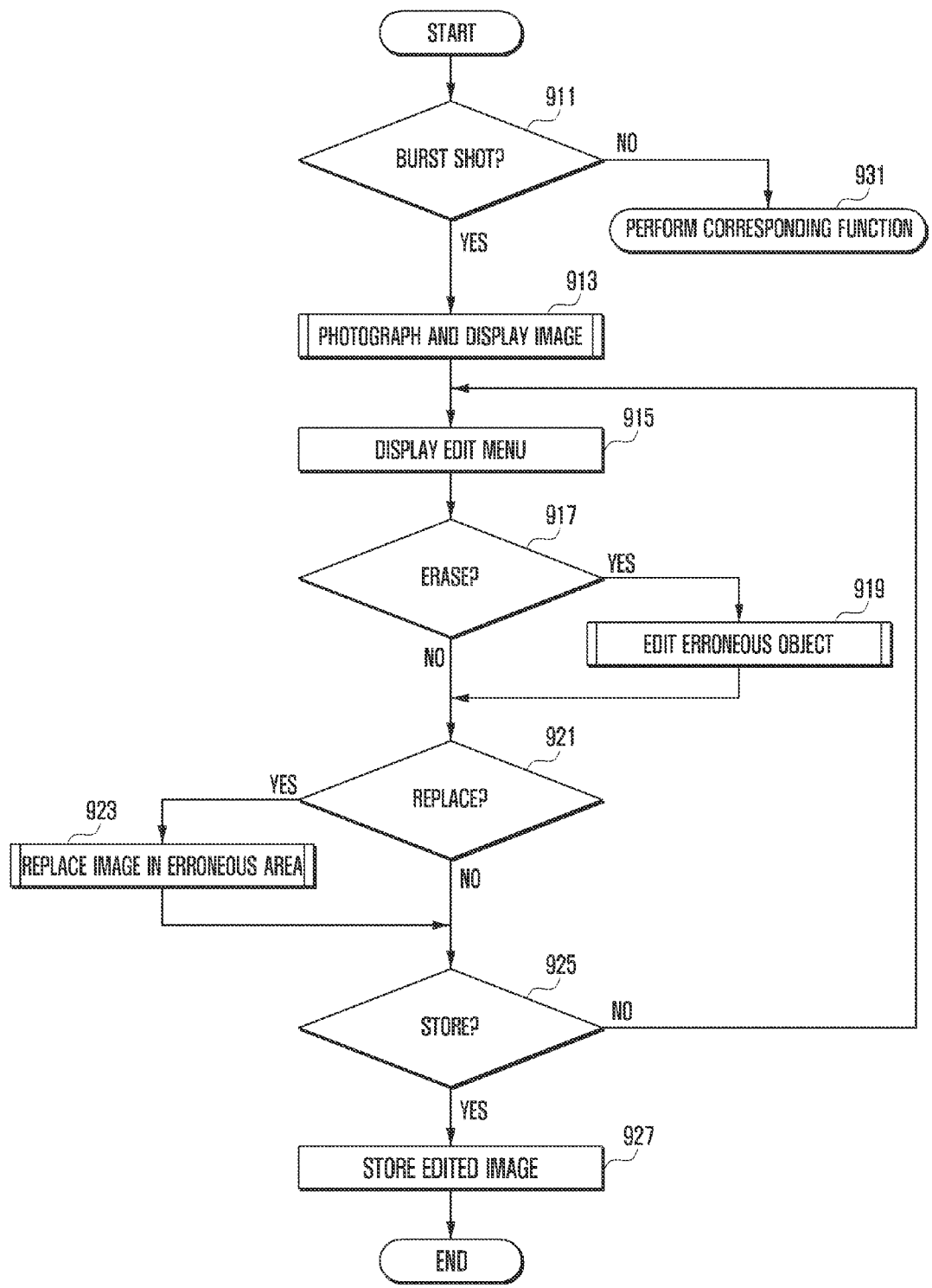
FIG. 9 is a flowchart illustrating a procedure of editing an object selected by a user in a camera device according to an embodiment of the present disclosure.

FIG. 9 is a flowchart illustrating a procedure of editing an object selected by a user in a camera device according to an embodiment of the present disclosure.

Referring to FIG. 9, if a photographer selects an error edit photographing mode through the input unit 140, the control unit 100 detects it at operation 911, and controls the camera 120 to operate in a burst shot mode at operation 913. Here, the error edit photographing mode may have a function of removing an image having a movement or replacing an image of specific area in a displayed image with another image. The reason why performing a burst shot operation in the error edit photographing mode is to obtain images for editing an error, and the images photographed by the camera 120 in a burst shot mode are buffered. If the burst shot operation is not performed, the control unit 100 controls to perform a corresponding function at operation 931. However, if the burst shot operation is performed, the control unit 100 controls the display unit 130 to display a frame image among the photographed images as a still image at operation 913. Here, a plurality of images is obtained by the burst shot operation, and the control unit 100 may display a specific frame image among the plurality of images in the display unit 130 as a still image at operation 913.

Here, the still image displayed in the display unit 130 may be the first frame image, the last frame image, or a specific frame image photographed by the burst shot operation. Further the still image displayed in the display unit 130 may be an image generated including a plurality of images from the buffered images.

As described above, a still image is displayed after a burst shot operation, and the control unit 100 may control the display unit 130 to display a menu to edit an error at operation 915. Here, the editing of an error may be performed by an eraser and by replacing an image. The eraser has an edit function of removing an object having a movement included in the image, and the replacing of an image is performed by replacing a specific area of an image with a corresponding area in another buffered frame image.

If the user selects an eraser menu through the input unit 140, the control unit 100 detects it at operation 917, and edits an erroneous object at operation 919. The method of editing an erroneous object may be performed by the same method as FIGS. 3 and 4. Namely, the camera device displays an object having a movement included in the image, and removes an object selected by the user. If an incompletely removed image exists in the removing process, the control unit 100 removes the image of interaction location generated according to an input of an eraser button by performing an eraser mode. After removing the object having a movement, the control unit 100 generates a still image including the location of removed object with an image of another frame image.

However, if a replace menu is selected from the edit menu, the control unit 100 detects it at operation 921, and replaces the image of error generated area at operation 923. Here, the erroneous image may be automatically detected by the device, or selected by the user. The erroneous object may be a human or an object as described above. The subject selector of the control unit 100 selects an image of an error generated area, the image replacing detector detects an image to replace the image of the selected subject, and the control unit 100 generates a still image by replacing the selected subject image with the detected replacement image.

If storing an image is requested after removing an object having a movement included in the image or replacing an erroneous object in the image, the control unit 100 detects it at operation 925, and stores the error edited image as a still image at operation 927.

Figure 10:
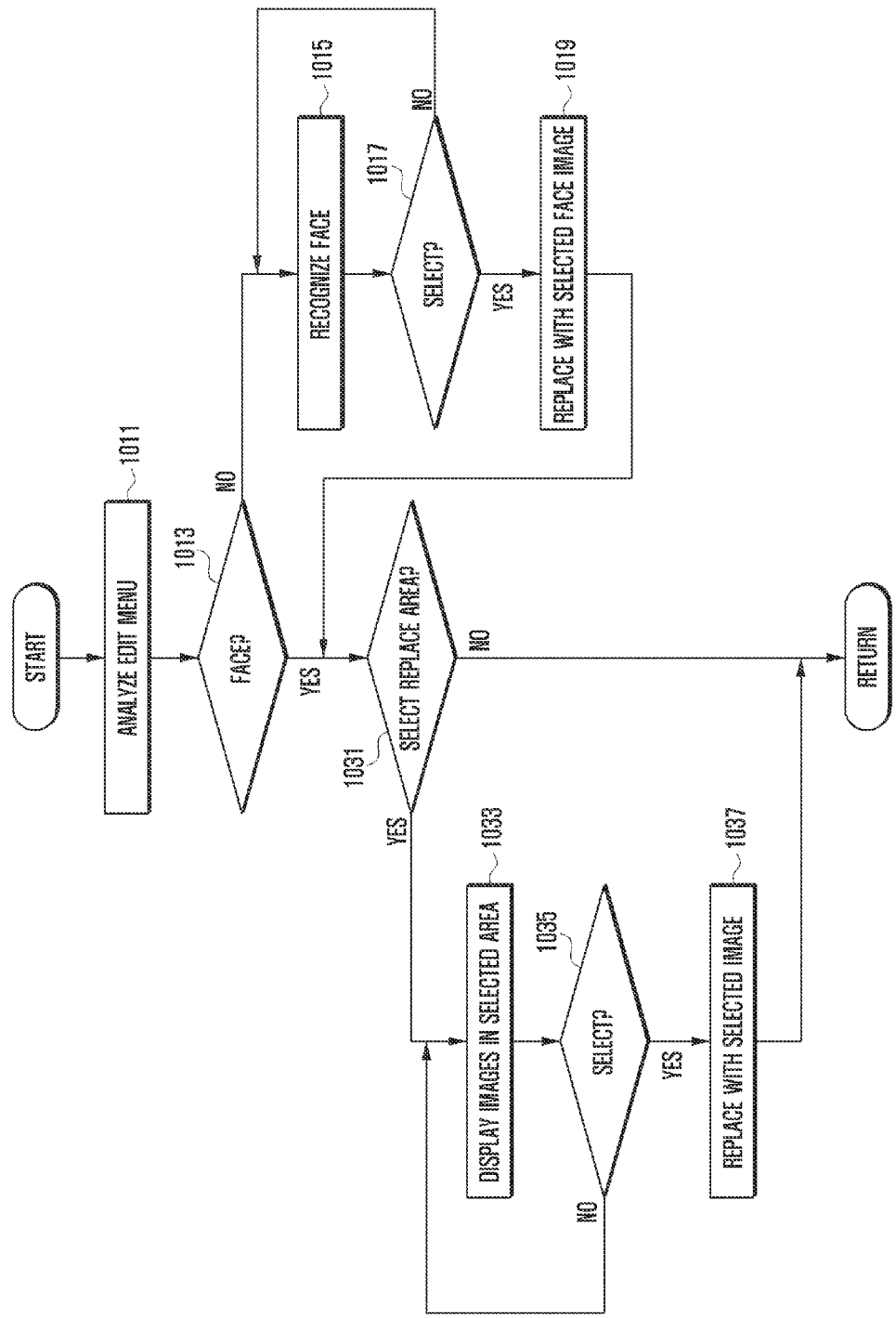
FIG. 10 is a flowchart illustrating a procedure of replacing an erroneous image having a movement in a photographed image according to an embodiment of the present disclosure.
Figure 11A:
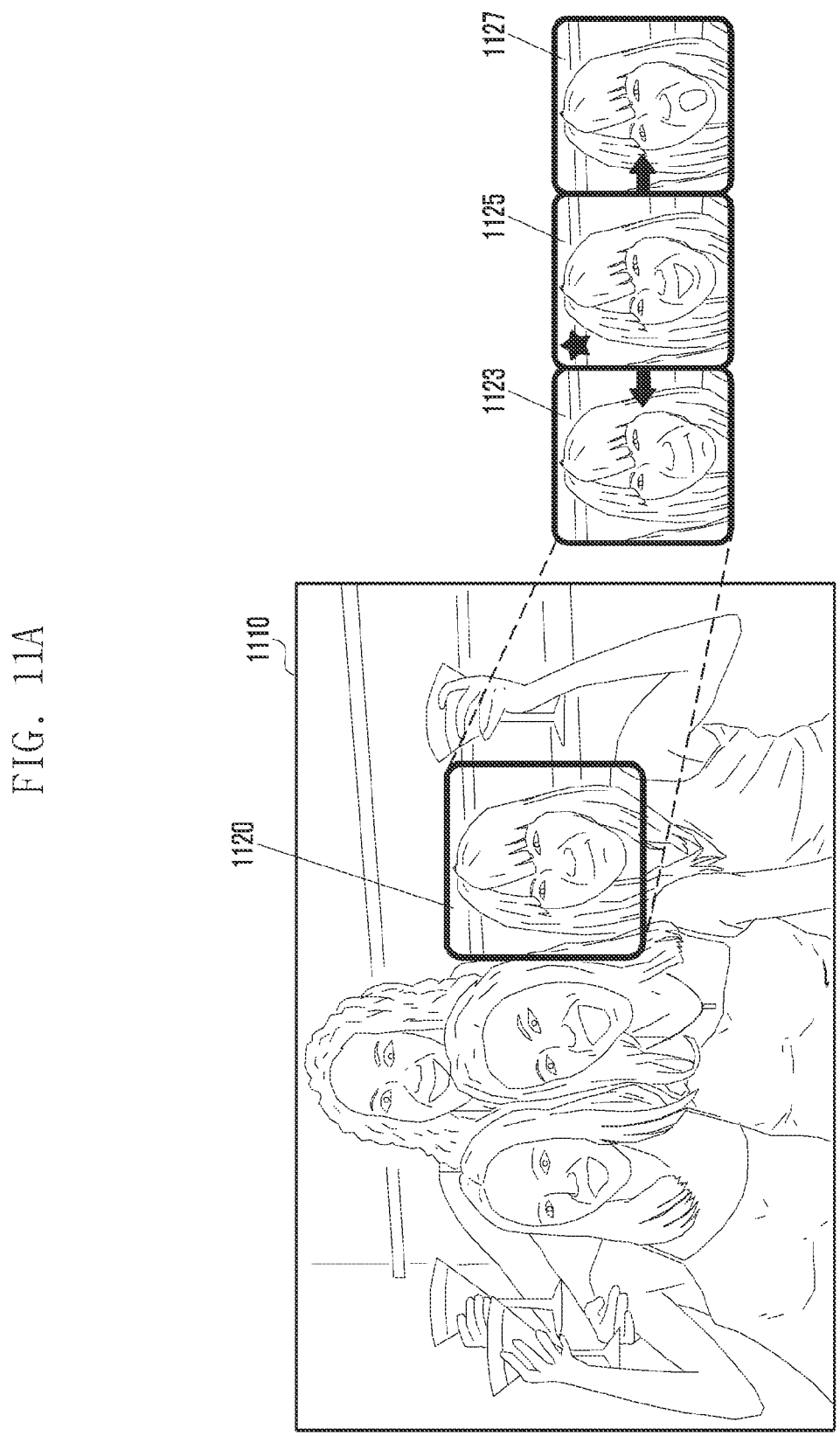
FIGS. 11A, 11B, and 11C illustrate a procedure of replacing an erroneous image having a movement in a photographed image according to an embodiment of the present disclosure.
Figure 11B:
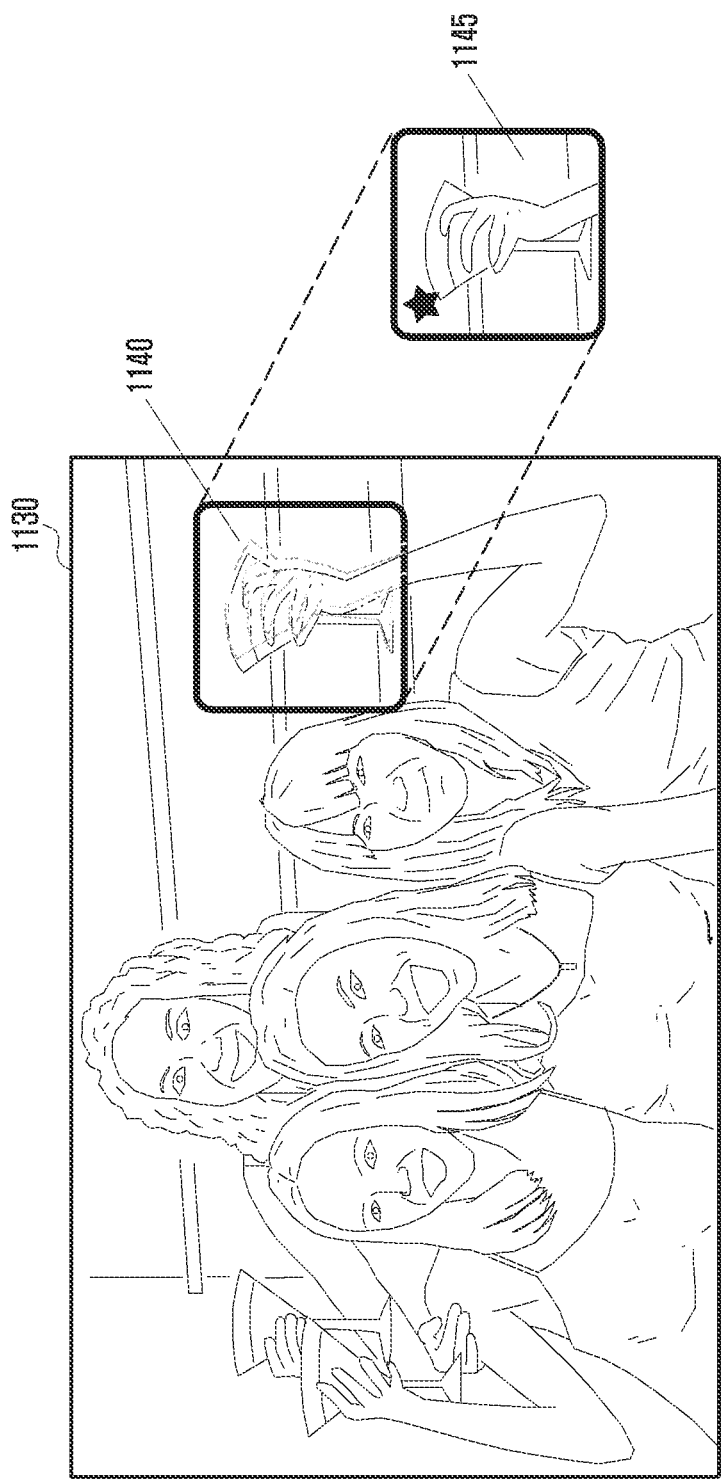
Figure 11C:
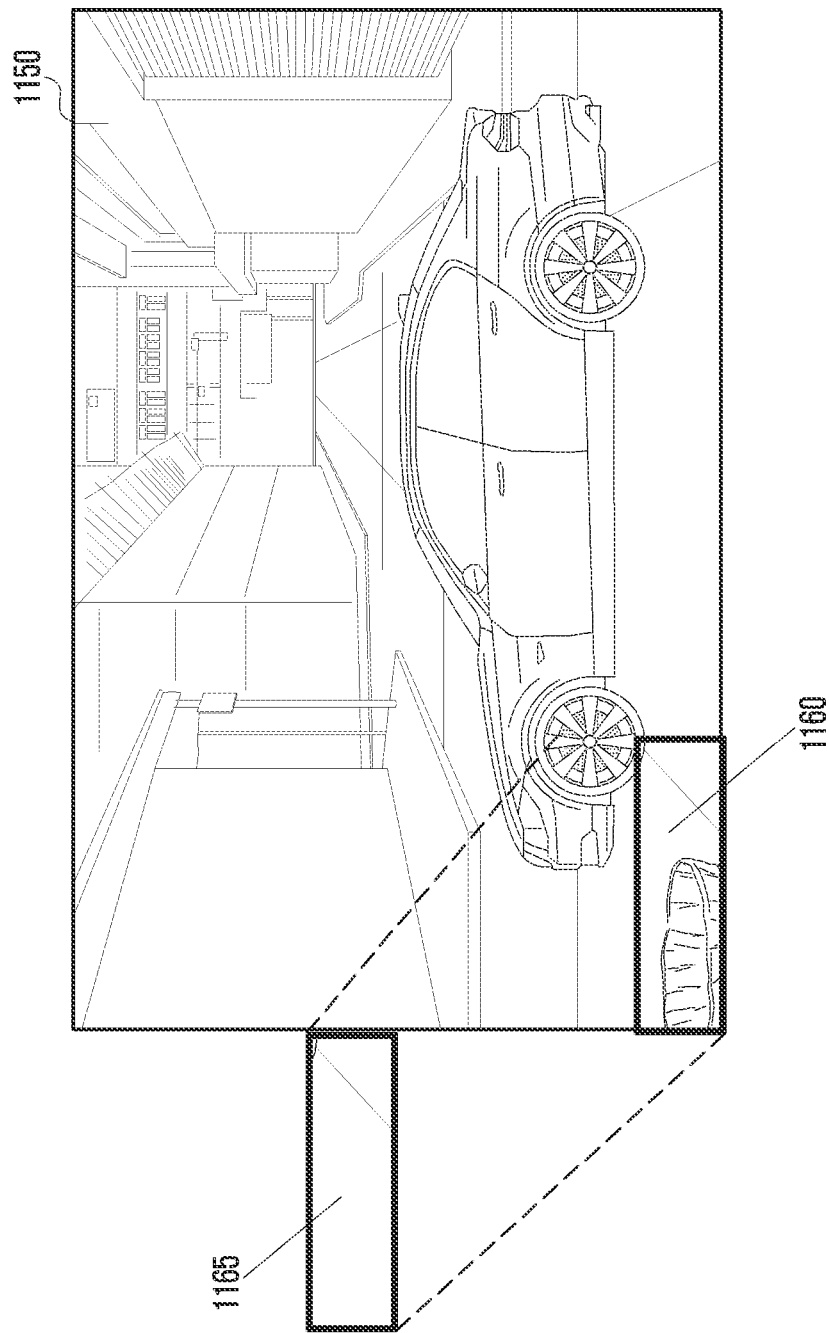

FIG. 10 is a flowchart illustrating a procedure of replacing an erroneous image having a movement in a photographed image according to an embodiment of the present disclosure, and FIGS. 11A, 11B, and 11C are a procedure of replacing an erroneous image having a movement in a photographed image according to an embodiment of the present disclosure.

Referring to FIGS. 10, 11A, 11B, and 11C, if a replacement edit menu is selected from the edit menu at operation 915, the control unit 100 analyzes an image of replacement area. Here, the replacement edit menu may include a menu to replace an erroneous face image with a normal face image and a menu to replace an erroneous image of area selected by the user with an optimum image.

The control unit 100 analyzes the selected edit menu at operation 1011, identifies whether the selected edit menu is to edit a face image at operation 1013, and replaces an erroneous face image by performing operations 1015 to 1019. FIG. 11A illustrates a procedure of replacing the erroneous face image. If a replacement editing function for an erroneous face is selected, the control unit 100 identifies a face area from an image at operation 1015. If the user selects a face to be replaced from the displayed image, the control unit 100 detects images including the selected face from the buffered images at operation 1017, and replaces the erroneous face image with a replacement image selected according to the priority of image at operation 1019.

Namely, if a function to replace a face image is selected, the control unit 100 identifies a face in a photo. If a face of a subject to be replaced is selected among the identified subjects, the control unit 100 automatically searches a photo having a face similar to the selected face from stored photos and replaces the face image with the found image. The priority of automatic searching is, as described above, performed in the sequence of searching an image having no blocking factor (obstacle covering a face), searching an image having no blur, searching an image having no closed eyes (showing pupils), searching an image having eyes directed to the front, searching an image having a smiling face, and searching an image having the closest location, size, and an angle compared to an object to be replaced. Thereafter, the selected image is replaced with a found image.

However, the function to replace a face image may be performed without using a face recognition method. In this case, the user selects a face area to be replaced through the input unit 140, as shown by 1120 in Screen 1110 of FIG. 11A. The method of selecting a replacement area may be performed by inputting a closed loop on the image 1120 or by touching the corresponding area. The control unit 100 detects it at operation 1031, and displays face images of the corresponding area found from the buffered images as shown by elements 1123 to 1127 of FIG. 11A at operation 1033. If the user selects a desired face image in the above state, the control unit 100 detects it at operation 1035, and replaces the face image 1120 with a face image selected by the user at operation 1037.

Besides the face area, other areas or object images may also be replaced upon a user selection. FIG. 11B illustrates an image having a blur displayed in the display unit 130. In the case of replacing an image of specific area having a blur 1140 as shown in Screen 1130 of FIG. 11B, if the user selects a replacement area, the control unit 100 detects it at operation 1031, and searches images having no blur in the selected area as shown by 1145 at operation 1033. If the user selects an image having no blur from the displayed images, the control unit 100 detects it at operation 1035, and replaces the image having a blur with the image having no blur at operation 1037.

In the image displayed as the above, an obstacle image of a specific area may be edited by replacement. FIG. 11C illustrates a procedure of replacing an image having an undesired obstacle with an image of a removed obstacle. If the user selects an erroneous area (obstacle) 1160 from the photo image shown by Screen 1150 of FIG. 11B, the control unit 100 replaces the erroneous area with an optimum image 1165 having no obstacle by selecting from the buffered images. If the obstacle located at the selected area is not a complicated image of a background screen, the control unit 100 may replace the obstacle 1160 with a background image 1185.

Further, the burst shot operation may be performed by differentiating an exposure like a bracket photographing. In this case, an image photographed with an incorrect exposure (i.e., an over-exposure or an under-exposure) may be edited by replacement. If the burst shot is performed with a plurality of exposures and if the user selects a dark area of the image photographed in a backlight condition, the control unit 100 searches images having an area similar to the selected area from the buffered images. The control unit 100 searches images having a normal exposure (i.e., the brightest photo and the darkest photo are excluded). Here, the decision of normal exposure may be performed based on an average value between the brightest photo and the darkest photo. After determining the normal exposure, the control unit 100 may replace the image in the selected area with an image having the normal exposure.

Figure 12:
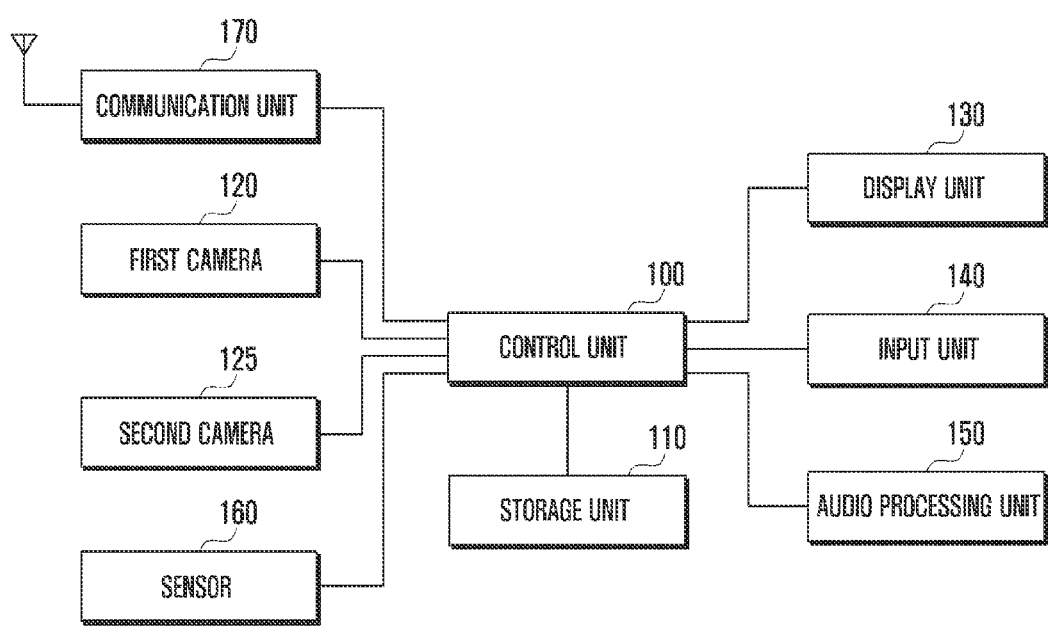
FIG. 12 is a block diagram illustrating a configuration of a portable terminal performing a photographing operation according to an embodiment of the present disclosure.

FIG. 12 is a block diagram illustrating a configuration of a portable terminal performing a photographing operation according to an embodiment of the present disclosure. Here, the portable terminal may be a mobile phone including a smart phone, a Motion Pictures Expert Group (MPEG-1 or MPEG-2) Audio Layer III (MP3) terminal, a tablet Personal Computer (PC), and various digital equipments having a camera.

Referring to FIG. 12, a communication unit 170 performs a communication function with a base station or other devices. The communication unit 170 may be configured with a transmitter for up-converting a frequency of a transmitting signal and for amplifying an electric power, and a receiver for low-noise amplifying and down-converting a frequency of a receiving signal. Further, the communication unit 170 may include a modulator and a demodulator. The modulator transmits a transmitting signal to the transmitter by modulating the signal, and the demodulator demodulates a signal received through the receiver. Here, the modulator and demodulator may be a Long Term Evolution (LTE) network, a Wide Code Division Multiple Access (WCDMA) network, a Global System for Mobile Communication (GSM) network, a Wireless Fidelity (WIFI) network, a Wireless Broadband (WIBRO) network, Near Field Communication (NFC), Bluetooth, or the like. In an embodiment of the present disclosure, the communication unit 170 is assumed to be configured with an LTE, WIFI, and Bluetooth devices.

A first camera 120 is a camera disposed at the rear side of the portable terminal, and may photograph a high resolution image. A second camera 125 is a camera disposed at the front side of the portable terminal, and may photograph a lower resolution image compared to the first camera 120. In an embodiment of the present disclosure, an auto-portrait mode may be used in a self-shot (self-portrait) photographing with the first camera 120 or when photographing a subject without looking through the display unit 130.

The control unit 100 controls the general operation of the portable terminal, performs a burst shot operation in a photographing mode, and controls to generate a still image by analyzing the burst shot images and by editing an erroneous object. Namely, while executing a photographing mode having an error editing function, the control unit 100 controls the first camera 120 and/or the second camera 125 to operate in a burst shot mode, controls to obtain a number of images for a period of time set by the burst shot mode, and controls to display a certain image among the obtained images as a still image. Further the control unit 100 replaces an erroneous images automatically extracted from the displayed image and/or an image of an area selected by the user with an image selected from the burst shot and buffered images.

A storage unit 110 may have a program memory for storing an operating program of the portable terminal, and a data memory for storing tables for the operation of portable terminal and data generated while executing a program. In an embodiment of the present disclosure, the control unit 100 can buffer images obtained by a burst shot operation as described above. A buffer buffering the images obtained by the burst shot may be configured independently from the storage unit 110, or an internal buffer of the control unit 100 may be used.

The display unit 130 displays information of an executing application under the control of the control unit 100. The display unit 130 may be configured with an LCD or OLED. The input unit 140 may be provided with a capacitive type or a resistive type, and outputs location information of a user's touch (i.e., a finger touch) to the control unit 100. Further, the input unit 140 may include an Electro-Magnetic Radiation (EMR) sensor pad, and detects a pen touch input to transmit to the control unit 100. Here, the display unit 130 and the input unit 140 may be integrated into one unit.

An audio processing unit 150 processes a voice signal generated in a communication mode and processes an audio signal generated in a photographing mode of the first camera 120 and/or the second camera 125. A sensor 160 may include various sensors for detecting movement of the portable terminal The sensor 160 may be configured with an acceleration sensor, a geomagnetic sensor, and/or a location detection sensor.

The portable terminal having the above configuration includes a rear camera and a front camera for photographing an image. Generally in photographing an image, a photographer takes a photo after determining a composition of a subject through a view finder or the display unit 130. The camera device may have a shutter lag, and accordingly, an actually photographed image may be different from an image identified by the user through the view finder or the display unit 130. The actually photographed image may include moving subjects and/or objects, and an undesirable image may be photographed due to the moving subject or due to the subject closing his/her eyes at the moment of photographing.

The portable terminal provides a photographing mode to remove an error, and may provide an eraser mode to remove an object having a movement included in the photographed image and/or an error editing mode to remove an erroneous image selected by a user. Here, the eraser mode and error editing mode may be provided as different photographing modes.

If the eraser mode according to an embodiment of the present disclosure is selected, the control unit 100 of the portable terminal controls the camera 120 to obtain a certain number of images for a period of time in a burst shot mode, and controls the display unit 130 to display a frame image among the obtained images. Subsequently, the control unit 100 detects each object having a movement by analyzing the images, and removes an object selected by the user from the detected object having a movement. Namely, the control unit 100 removes objects having a movement in the displayed image, and generates a still image by replacing an area of a removed object with an image of the corresponding area selected from the burst shot and buffered images.

If the error editing mode according to another embodiment of the present disclosure is selected, the control unit 100 of the portable terminal controls the camera 120 to obtain a number of images for a period of time in a burst shot mode, and controls the display unit 130 to display a frame image among the obtained images. Subsequently, if the user selects a specific area of the displayed image, the control unit 100 identifies an image of the corresponding area, and controls to display images having the corresponding area by searching the burst shot and buffered images. If the user selects one of the displayed images, the control unit 100 replaces an erroneous image selected by the user with another image selected by the user. If a face recognition function is provided and the selected area is a face image, the control unit 100 may search images having the corresponding face from the buffered images and replace the selected area with an image having the highest priority.

As described above, the photographing method of editing an error in the portable terminal may include a method of removing an object having a movement and a method of replacing an object of error generated area with an object of normally photographed image.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for photographing an image with a portable terminal having a camera, the method comprising:
    buffering burst shot images;
    displaying an image among the buffered burst shot images;
    extracting at least one object having a movement based on the buffered burst shot images;
    displaying the extracted at least one object through highlighting;
    displaying at least one of the buffered burst shot images corresponding to the extracted at least one object;
    selecting an image of the displayed burst shot images;
    erasing, automatically, the at least one object having the movement from the displayed image; and
    generating and displaying a still image by replacing the displayed image including the at least one object having the movement, at a location where the at least one object is erased, with the selected image among the buffered burst shot images,
    wherein the still image excludes the at least one object having the movement.

2. The method of claim 1, wherein the erasing of the at least one object comprises:
    selecting the at least one object having the movement based on the buffered burst shot images; and
    erasing the selected at least one object having the movement based on the buffered burst shot images.

3. The method of claim 2, wherein an eraser button is displayed in a screen displaying the image, and further comprising:
  erasing an image area at which a touch interaction is detected, if the eraser button is selected after erasing the at least one object.

4. The method of claim 3, wherein the displaying of the at least one object having the movement is performed by distinguishing a border line and/or color of the at least one object having the movement.

5. An apparatus for photographing an image, the apparatus comprising:
  a camera configured to obtain an image by a burst shot;
  a memory configured to buffer burst shot images;
  a display configured to display an image; and
  a processor configured to:
    control the camera to perform the burst shot, if the burst shot is requested,
    buffer the burst shot images in the memory,
    display an image among the buffered burst shot images,
    extract at least one object having a movement based on the buffered burst shot images,
    display the extracted at least one object through highlighting,
    display at least one of the buffered burst shot images corresponding to the extracted at least one object,
    select an image of the displayed burst shot images,
    erase, automatically, the at least one object having the movement from the displayed image, and
    generate and display a still image by replacing the displayed image including the at least one object having the movement, at a location where the at least one object is erased, with the selected image among the buffered burst shot images,
  wherein the still image excludes the at least one object having the movement.

6. The apparatus of claim 5, wherein the processor is further configured to:
  select the at least one object having the movement based on the buffered burst shot images, and
  erase the selected at least one object having the movement based on the buffered burst shot images.

7. The apparatus of claim 6, wherein the processor is further configured to:
  display an eraser button in a screen displaying the image, and
  erase an image at a location where a touch interaction is detected, if the eraser button is selected after erasing the at least one object.

8. The apparatus of claim 7, wherein the processor is further configured to display the at least one object having the movement by distinguishing a border line and/or color of the at least one object having the movement.

9. The apparatus of claim 6, wherein the processor comprises an error editing mode and is further configured to display images corresponding to an erroneous area selected from buffered images, if the error editing mode is selected, wherein an erroneous area is selected from a display screen, and to replace the image of the erroneous area with a selected image, if the displayed image is selected.

* * * * *